Oct. 29, 1968 R. B. HENNIS 3,408,458

LINE IDENTIFYING AND MARKING APPARATUS

Filed Dec. 2, 1964 4 Sheets-Sheet 1

INVENTOR
ROBERT B. HENNIS

BY Donald F Voss

ATTORNEY

Oct. 29, 1968 R. B. HENNIS 3,408,458

LINE IDENTIFYING AND MARKING APPARATUS

Filed Dec. 2, 1964 4 Sheets-Sheet 2

Oct. 29, 1968 R. B. HENNIS 3,408,458

LINE IDENTIFYING AND MARKING APPARATUS

Filed Dec. 2, 1964 4 Sheets-Sheet 3

Oct. 29, 1968 R. B. HENNIS 3,408,458

LINE IDENTIFYING AND MARKING APPARATUS

Filed Dec. 2, 1964 4 Sheets-Sheet 4

3,408,458

LINE IDENTIFYING AND MARKING APPARATUS

Robert B. Hennis, Rochester, Minn., assignor to International Business Machines Corporation, New York, N.Y., a corporation of New York Filed Dec. 2, 1964, Ser. No. 415,232
16 Claims. (Cl. 178—15)

ABSTRACT OF THE DISCLOSURE

A line marking system is provided which includes apparatus for identifying the location of certain lines on a document in terms of digital data while the document is in a reading station. This data is stored and as the document moves relative to a selectively operable line marking device, each line position on the document is identified in terms of digital data. This latter line identifying data is compared with the line identifying data from storage and when there is equal comparison, the line marking device is operated.

Figure 1:
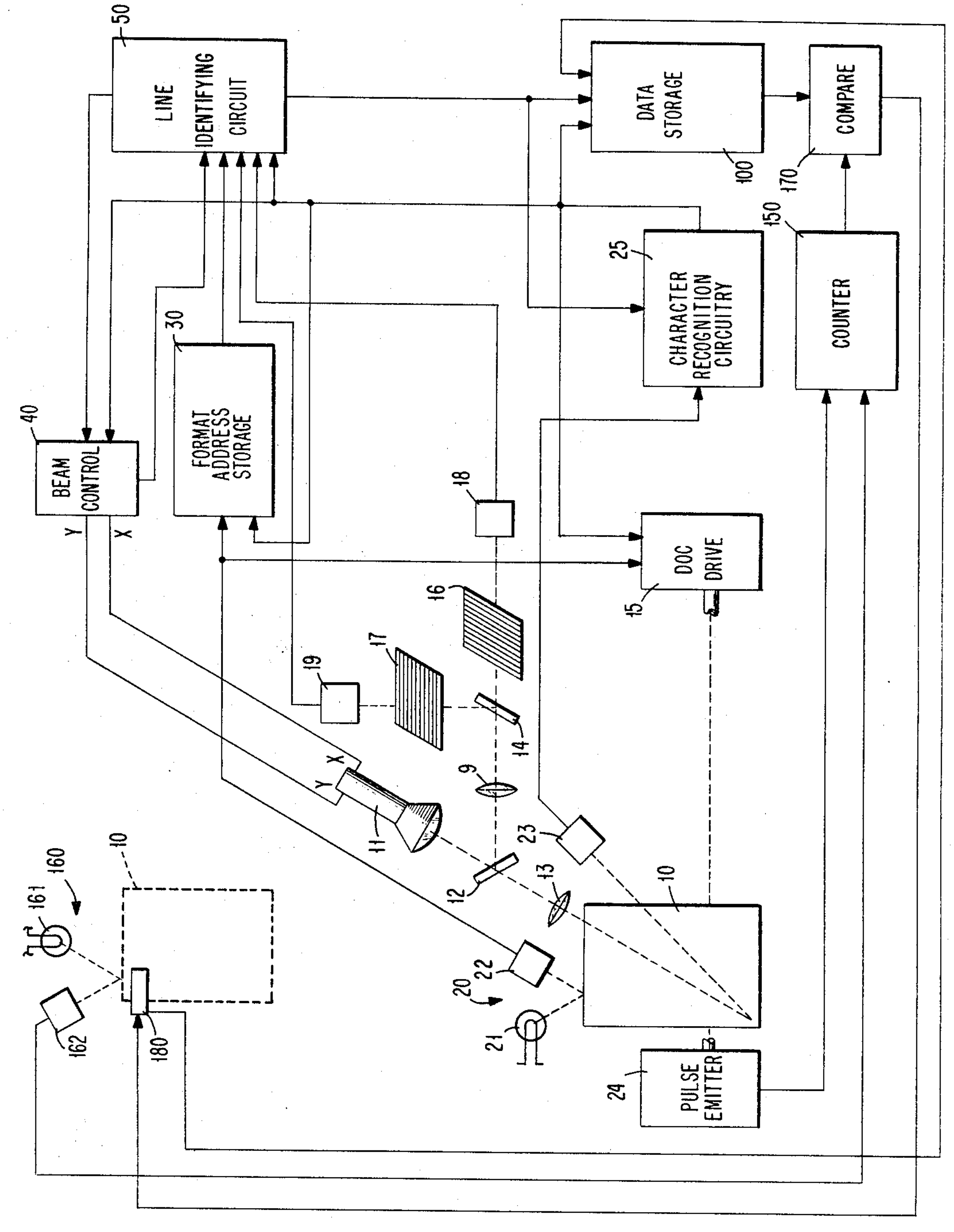

This invention relates to apparatus for identifying a line position on a document and marking the line position so identified and more particularly to apparatus for identifying a line position on a document while the same is in a reading position and thereafter using this information to re-identify the line when, in response to advancing the document from the reading position, the line becomes aligned with a marking device.

Heretofore, line identifying and marking devices were related in a fixed manner. For example, the line marking device such as a printer or punch was positioned in a fixed position relative to the apparatus for sensing or reading a line of data. Hence, if the data read were in error, as determined by a checking device, then the marking device would be operated whereby the line would be marked with some distinguishing mark or symbol. This enables an operator to visually determine the line in error and manually correct the same without having to correct the entire document. Line identifying and marking devices of this type were also used to cause a document to be marked so that it could properly be positioned for a subsequent printing or punching operation.

These prior art devices are not suitable for identifying and marking a line position where the document is being read by a random or movable sensor such as in a document page reader. This is because there is no fixed relationship between the document reading head or scanner and the document. Also some type of servoing mechanism between the marking device and the movable sensor would be required. The problem is accentuated in those readers where it is undesirable to have the marking device located in the document reading area such as in optical readers having a flying spot scanner.

Accordingly, in this invention, the line position to be marked is first identified by a random type sensor. The data identifying the line position is then stored. After the document is moved from the reading position, each line position on the document is identified in terms of data by a second line identifying device and this so developed identifying data is compared with the stored identifying data. When there is a comparison between the stored identifying data and the newly developed identifying data, the identified line position is registered relative to a marking device which is then operated.

The position of the second line identifying device is fixed. Additionally, when the second line identifying device identifies a line of data, that line of data will always be in the line marking position. Of course, this does not require the second line identifying device to be in alignment with the line marking device. However, there is a fixed relationship between the second line identifying device and the line marking device.

Accordingly, a prime object of the invention is to provide improved apparatus for identifying line positions on a document and to operate a marking device when the identified line positions become aligned therewith.

A very important object of the invention is to provide improved apparatus for identifying certain line positions on a document for a first time while the document is in a reading station and then identify these line positions a second time as the same become aligned relative to a marking device.

Another object of the invention is to provide improved apparatus for identifying line positions on a document without providing markings or coded data on the document.

The foregoing and other objects, features and advantages of the invention will be apparent from the following more particular description of a preferred embodiment of the invention, as illustrated in the accompanying drawings.

Figure 2A:
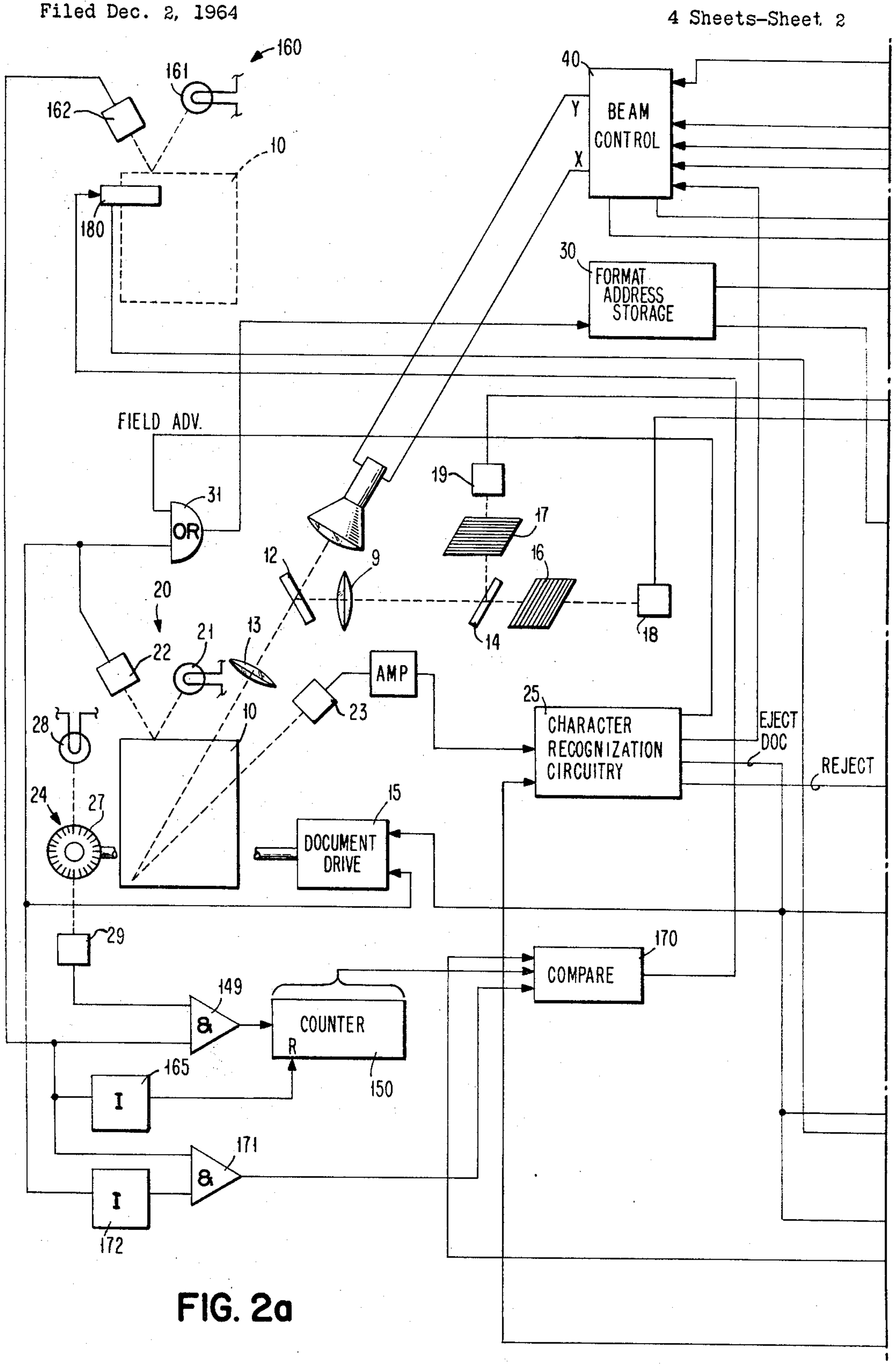
Figure 2B:
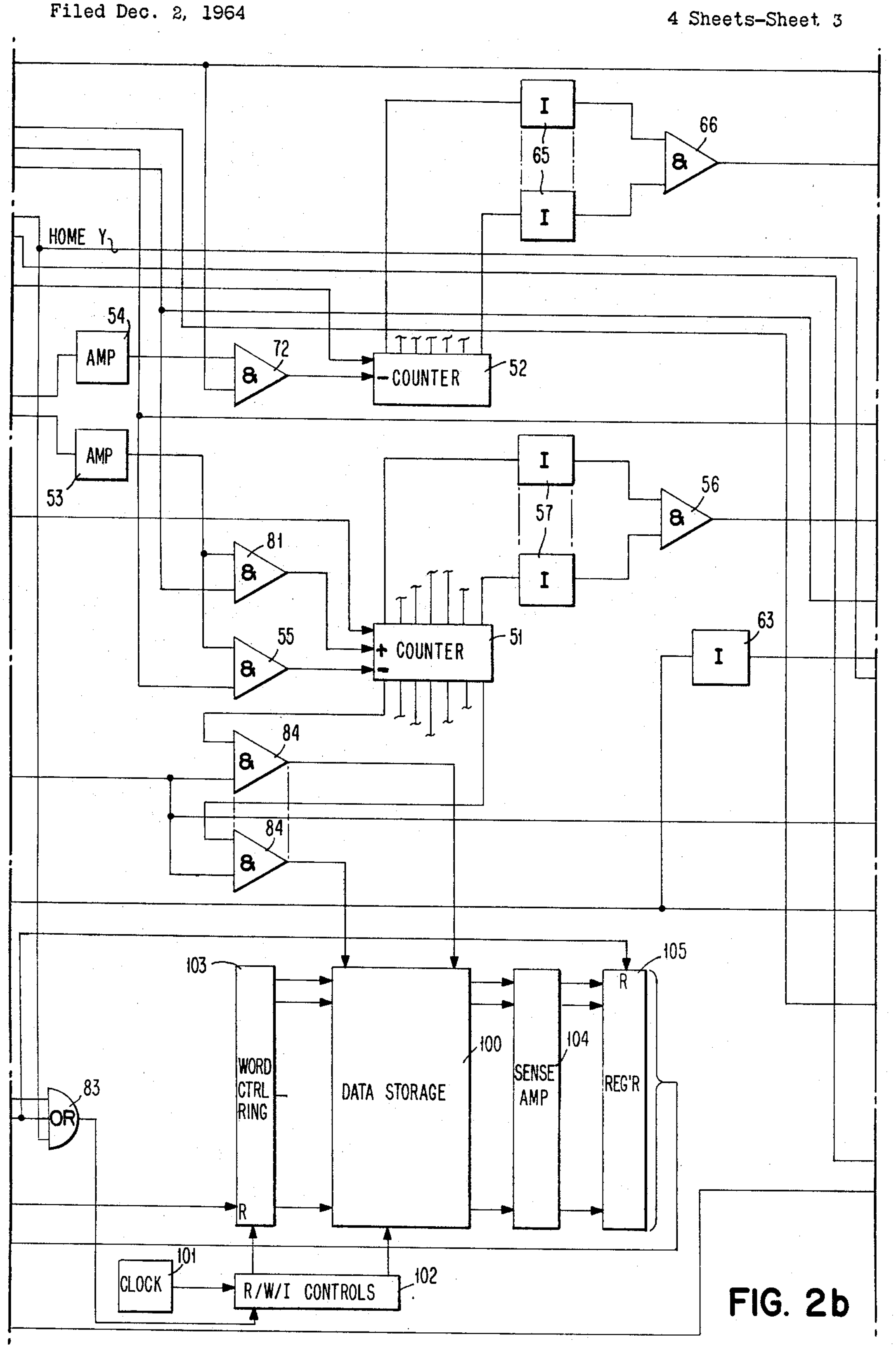
Figure 2C:
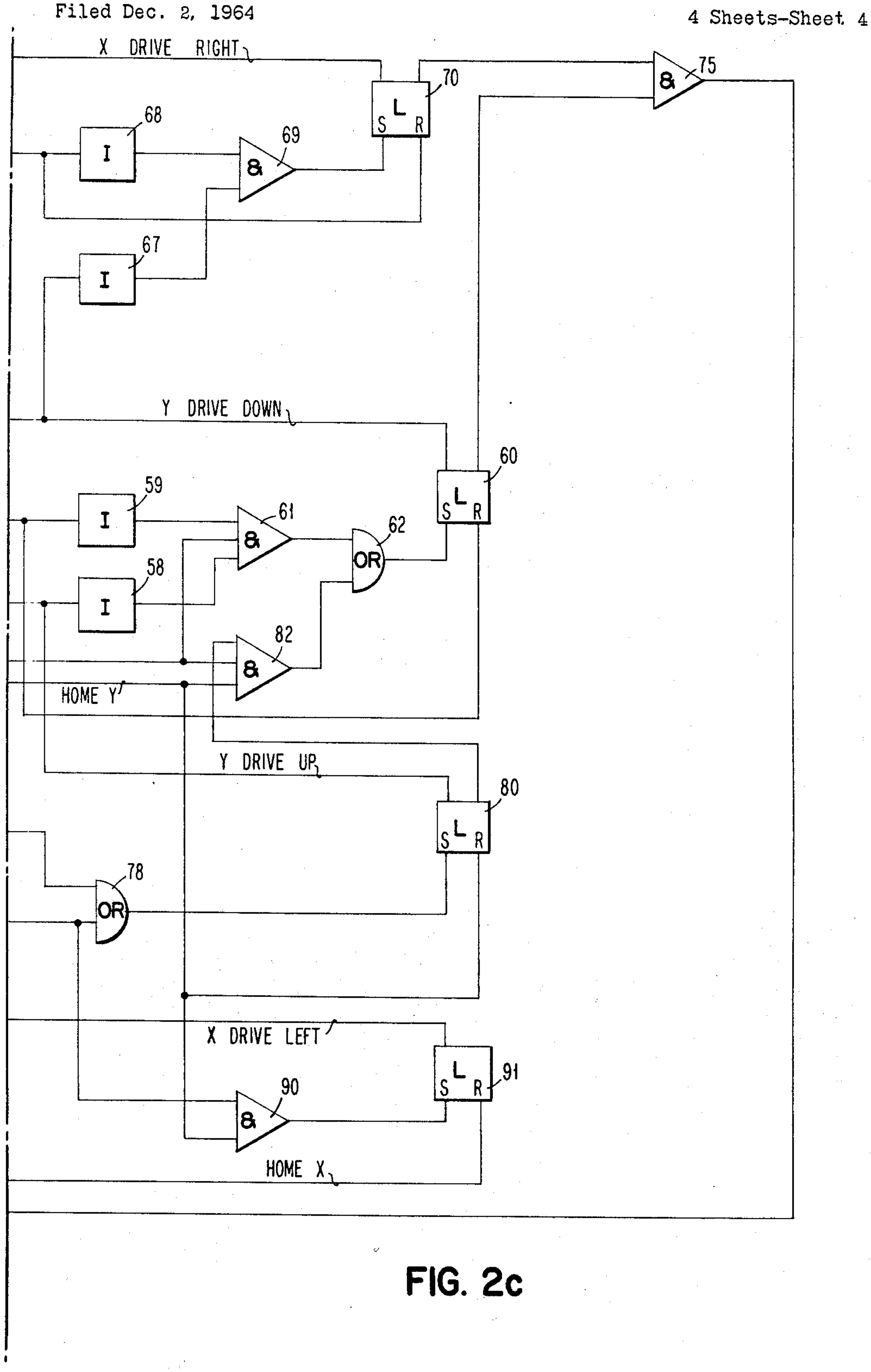

In the drawings:

FIG. 1 is a block diagram illustrating the invention; and,

FIG. 2 consisting of FIGS. 2*a*, 2*b* and 2*c* with FIG. 2*b* to the right of FIG. 2*a* and FIG. 2*c* to the right of FIG. 2*b* is a schematic logic diagram of the invention illustrated in block form in FIG. 1.

GENERAL

FIG. 1 illustrates the invention by way of example in block form. Document 10 is transported into the read station by document drive 15. When document detector 20 consisting of light source 21 and light sensitive element 22 detects the leading edge of the document 10, a signal is passed from light sensitive element 22 to document drive 15 to stop the same whereby document 10 is brought to rest in the reading position.

Also as the detector 20 detects the leading edge of document 10 in the reading position, a signal is passed from light sensitive element 22 to format address storage 30. The format address storage 30 in response to receiving the signal from light sensitive element 22 transfers a set of vertical and horizontal values or addresses to the line identifying circuitry 50 which in this instance will be utilized in developing signals for causing beam control 40 to deflect the beam of cathode ray tube 11 in vertical and horizontal directions to the first field location. It should be noted that the cathode ray tube 11 is a conventional flying spot scanner for scanning characters on document 10. Beam control 40 is used for controlling the beam of cathode ray tube 11 during the character recognition, the format control and the line identifying processes. Beam control 40 is of the well-known type for deflecting the beam of cathode ray tube 11. The format address circuitry 30 and the character recognition circuitry 25 do not form a part of the invention; however, they do facilitate an understanding of it, and therefore are included.

Once the beam of the cathode ray tube 11 has been deflected from its horizontal and vertical home position to a first field of information, the operation switches to a character recognition mode. This is accomplished in the following manner. The beam of the cathode ray tube 11 is intercepted by a first beam splitter 12 which passes a portion of the beam onto lens 13 and another portion via lens 9 to beam splitter 14. The lens 13 focuses the beam onto document 10 while the beam splitter 14 divides the beam into two other light paths. The further divided beam in one light path engages vertical grids 16 and in the other light path engages horizontal grids 17. The vertical and horizontal grids 16 and 17 are of the type well-known in the art and have alternate opaque and transparent areas of finite widths. In this example, the opaque lines are .015 inch at .030 pitch. Photomultipliers 18 and 19 sense the respective divided beams as they move relative to grids 16 and 17.

Photomultiplier 23 is activated by that portion of the beam reflected from document 10 in response to the beam being focused thereon by lens 13. The outputs of photomultipliers 18 and 19 are connected to the line identifying circuit 50 and the output of photomultiplier 23 is connected to the character recognition circuitry 25. During the time that the beam is being positioned to first of information, the character recognition circuitry 25 is in a format control mode and therefore the signals passed by photomultiplier 23 at this time are not utilized. However, the signals developed by photomultipliers 18 and 19 are utilized by the line identifying circuit 50 to determine when the beam of the cathode ray tube 11 has moved from its vertical and horizontal home position to the first field position on document 10. The details of how the line identifying circuitry 50 determines that the beam has arrived at the first field position designated by the format address storage 30 will be described later herein.

Hence, assuming that the beam has arrived at the designated field position, the line identifying circuit 50 passes a signal to the character recognition circuitry 25 which switches the operation into a character recognition mode. In this mode, the beam control 40 is controlled by character recognition circuitry 25 and the beam is caused to scan the characters on document 10. The particular way in which the characters are scanned and recognized is not of concern in this invention. The characters within a field are scanned consecutively and after all characters within a field have been scanned, the operation switches to the format control mode where the beam is positioned to a new field. A field may consist of one or more vertically arranged lines.

During the scanning of the characters for information purposes, some characters cannot be recognized. This is true even with the best character recognition systems. It is not unusual during a printing process to print a character with parts missing or to degrade the appearance of the character to a point where it is difficult to recognize the character. The primary objective of most character recognition systems is to keep the number of substitutions and rejects to a minimum. If the line on the document containing the reject character is marked with some distinguishing symbol, then, after the document has been completely read by the character recognition machine, an operator can visually determine the line or lines in error and manually correct the same without having to correct the entire document.

In this particular example, the character recognition cricuitry 25 develops a Reject signal if it is unable to recognize a character within a field. This Reject signal essentially switches the operation to a line identifying mode when the end of that line in the field of information is reached. The end of a line in a field is sensed by the character recognition circuitry 25 when it recognizes a format line or some special character. The Reject signal developed by the character recognition circuitry 25 is sent to line identifying circuitry 50 and data storage 100.

This signal causes the line identifying circuit 50 to activate beam control 40. While this operation will be described in greater detail later herein, briefly, beam control 40 causes the beam to move upwardly in a vertical direction until it reaches the top or leading edge of the document 10, which, in this example, is the vertical home position. As the beam moves in this vertical direction, the signals developed as a result of the beam traversing the grid 16 are accumulated by the line identifying circuit 50. It should be noted that since the beam is moving in a vertical direction only, there will not be any signals at this time from photomultiplier 19 to the line identifying circuit 50.

Line identifying circuit 50 develops a value from the signals passed thereto at this time from the photomultiplier 18. Further, data storage 100 is conditioned by the Reject signal from the character recognition circuitry 25 to receive this value fom the line identifying circuit 50. At the time the beam reaches the vertical home position, the accumulated value in line identifying circuit 50 is transferred to data storage 100. Further, the line identifying circuit 50 is operated by the signal from beam control 40 indicating that the beam is in the vertical home position whereby it develops a signal which is transferred back to beam control 40. This signal causes beam control 40 to send the beam downward in a vertical direction to the position from which it started during the line identifying operation. As the beam is moved downwardly, signals are again developed by means of grid 16 and photomultiplier 18 and these signals are passed to the line identifying circuit which determines when the beam has been returned to its starting position. Upon the beam reaching the starting position, the line identifying circuit 50 sends a signal to beam control 40 to halt further movement of the beam. The line identifying circuit 50 also sends a signal to character recognition circuitry 25 to switch is back into the charatcer recognition mode or the format control mode, depending upon whether there is another line to read or if the beam is to be positioned to a new field. Further scanning of lines of data within the field, if any, takes place in the manner previously described. If there are no more lines within the field, the operation switches to the format control mode.

Format address storage 30 is signalled by character recognition circuitry 25 to provide values to line identifying circuit 50 and the beam is positioned to the new field. Upon the beam being positioned to the new field, the mode then switches to the character recognition mode in the manner previously described. If during the scanning of these lines of data, a reject occurs, the line containing the rejected character is identified and the identifying value is entered into storage 100 in the same manner as just described. The operation of positioning the beam to new fields, of scanning lines of data within a field, and of identifying lines containing rejected characters continues until all fields of data upon the document have been scanned. It should be noted that the line identifying circuit 50 is primarily used to identify the line containing the rejected character and its use to locate the beam to a field is incidental.

Upon completely reading the document 10, the character recognition circuitry 25 develops a signal for activating document drive 15, for returning the beam to its horizontal and vertical home position and for making the first value in data storage 100 available to compare circuit 170. The documented drive 15 causes the document 10 to be transported from the reading station to a stacking station, not shown. The document drive 15 also drives a pulse emitter 24 which develops pulses having the same interval as pulses developed by grid 16 and photomultiplier 18. The pulses from pulse emitter 24 are applied to counter 150 under control of document detector 160 positioned intermediate of the reading and stacking stations. The document detector 160 consists of a light source 161 and a light sensitive element 162. The output of the light sensitive element 162 is schematically shown as being connected to counter 150 for controlling the entry of pulses therein from pulse emitter 24. The output of the counter 150 is connected to compare circuit 170 which has also an input from data storage 100.

It will be recalled that data storage 100 contains sequentially arranged values representing the sequential positions of the lines on document 10 containing rejected characters. As previously stated, after the document has been completely read, the character recognition circuitry 25 provides a signal to data storage 100 to make the first value identifying a line containing a rejected character available to compare circuit 170. When the counter 150 develops a value from the pulses furnished by emitter 24 which equals this first value entered to compare 170 from data storage 100, compare 170 generates a signal for operating printer 180. At the time printer 180 is operated, the document 10 will be in a position whereby the first line containing a rejected character is in registration relative to printer 180. Activation of the printer develops a signal for operating data storage 100 whereby the next value representing the next line containing a rejected character is made available to compare 170. Obviously, the signal from compare 170 could be used to transfer the next value in storage 100 to compare 170. During the time of data transfer, the counter 150 continues to accumulate the pulses from pulse emitter 24. However, the spacing between lines on document 10 and the operation of data storage 100 is such that the value in the counter 150 will not have reached an amount equal to the value representing the next line containing the rejected character before the value is transferred from data storage 100 to compare 170.

When the value in counter 150 again is equal to the value furnished to compare 170 from data storage 100, compare 170 again passes a signal to operate printer 180. Printer 180 functions to print a mark on document 10 which is positioned so that the next line containing a reject character is registered in print position. Printer 180, upon being operated, sends a signal to data storage to make the next value therein available to compare 170. The operation continues in the sequence described until all values in storage 100 have been made available to compare 170 and the document 10 has moved out from under detector 160. As the detector 160 detects the trailing edge of document 10, it provides a signal for resetting counter 150. A new document can now be brought into reading position and the above described process is repeated.

The foregoing generally describes how a line containing a rejected character is identified for a first time. It also describes how this identification is stored and thereafter is used to re-identify the line when the document is advanced from the reading position and the previously identified line becomes aligned with the printer or marking device. The following describes in detail how the above mentioned functions are accomplished.

DETAILED DESCRIPTION

With reference to FIG. 2, form at storage 30 contains values expressing the number of grid lines a field location on document 10 is displaced in the vertical and horizontal directions from the upper left hand corner or home position of the document 10. Values are stored in format address storage 30 for the location of each field containing characters to be scanned for information purposes. A field can contain one or more vertically arranged lines of characters. Again, it should be noted that format control, i.e., the positioning of the beam to various fields, and character recognition are not parts of this invention, but they do share some of the apparatus embodying this invention and aid in its understanding.

Before describing the transfer of values from format address storage 30, some initial conditions will be described. Data storage 100 is assumed to be initially cleared and the read-write and index controls 102 are reset and ready to address the first word in storage 100 via the word control ring 103. The beam of the cathode ray tube 11 is in its home position. In this particular example, the home positoin of the beam coincides with the upper left hand corner of the document 10 when the same is aligned in the reading position. It should be understood that the home position of the beam could be elsewhere; however, it should be referenced to some particular location on the document. For example, the document could contain vertical and horizontal marks for describing a reference position. These marks would then also have to be sensed by detector 160 during the line marking operation.

However, since the document detector 20 detects the leading edge of the document in the reading station, for the purpose of stopping the document, it is quite easy to align the beam home positoin of the cathode ray tube 11 with the upper left hand corner of the document. Additionally, all line positions identified must be referenced to some physical location on a document. Therefore, since photo-detector 160, in this example, functions to detect the leading edge of the document, all locations on the document are referenced to the leading edge of the document. Of course, as previously mentioned, photo-detector 160 could be set so as to detect some reference mark on the document and the position of all other lines on the document could be identified relative to this reference mark. It should be noted that the document detector 160 is fixed in position relative to printer 180 in a predetermined manner.

With the leading edge of the document 10 having been detected by detector 20 in the reading position, document drive 15 is signalled to stop and the format address storage 30 is operated to transfer values therein to vertical or Y address counter 51 and to horizontal or X address counter 52. The signal developed by detector 20 is passed from light sensitive element 22 through logical OR circuit 31 to format address storage 30. The particular manner in which the values from format address storage 30 are entered into counters 51 and 52 is immaterial. In other words, the values could be entered either in serial or in parallel fashion. It can be noted at this time that logical OR circuit 31 also has an input connected to character recognition circuit 25 for receiving a Field Advance signal. This signal causes a new field position to be transferred from format address storage 30 to counters 51 and 52.

Essentially, the values in counters 51 and 52 cause the beam to move from its home position first in a vertically downward direction and then in a horizontal direction to the right so as to become positioned to the first field location. To determine when the beam has moved vertically downward the required distance, the value in counter 51 is compared against a value developed by means of grid 16 and photomultiplier 18 as the beam traverses grid 16. In this particular example, a direct comparison operation is not used, rather each pulse developed by grid 16 and photomultiplier 18 is entered into counter 51 so as to subtract from the value therein. The output of photomultiplier 18 is connected to the input of an amplifier 53 which has its output connected to an input of logical AND circuit 55. The output of logical AND circuit 55 is connected to an input terminal of counter 51 which permits the pulses entered to subtract from the total value therein. Logical AND circuit 55 also has an input connected to the set output of a latch 60 which when set provides a control signal to beam control 40 for directing the beam vertically downward. Latch 60 is set at the time the beam is at the vertical or Y home position. When the counter 51 reaches the zero value as the subtracting pulses are entered therein, the beam will have been moved from its home position in the vertical downward direction the prescribed distance.

Logical AND circuit 56 functions to determine when counter 51 reaches the zero value. Logical AND circuit 56 has inputs connected to inverters 57 which have their inputs connected to the outputs of the stages constituting counter 51. Hence, when all stages of counter 51 are inactive, the value in counter 51 is zero. When the counter 51 reaches zero, the vertical downward movement of the beam is to be stopped. However, a further control is required because, as it will be seen later herein, counter 51 is also used when the beam is caused to move vertically upward during the line finding operation and at that time a different control is required. This further control is accomplished by connecting the output of logical AND circuit 56 to the input of inverter 59 and to the reset input of latch 60. Inverter 59 has its output connected to an input of logical AND circuit 61. Logical AND circuit 61 also has inputs connected to the outputs of inverters 58 and 63. Inverter 58 has its input connected to the set output of latch 80 for providing a control signal for indicating that the beam should be moved vertically upward. Inverter 63 has its input connected to the output of the character recognition circuitry 25 on which the Eject Document signal appears. The output of logical AND circuit 61 is connected to an input of logical OR circuit 62 which has its output connected to the set terminal of latch 60. Hence, when logical AND circuit 56 does not have an output, which occurs when the counter 51 is not at zero and latch 80 is not set, the latch 60 is set. The set output of latch 60 is connected to beam control 40 to provide a signal thereto for indicating that the beam should be driven vertically downward.

Since the output of logical AND circuit 56 is also connected to the reset terminal of latch 60, then, when the counter 51 reaches the zero value, logical AND circuit 56 does have an output and this causes latch 60 to be reset. With latch 60 reset, there will be no signal to beam control 40 for moving the beam vertically downward. Additionally, when latch 60 becomes reset, logical AND circuit 69 becomes conditioned to pass a signal to the set terminal of latch 70. The set output of latch 60 is connected to the input of inverter 67 which has its output connected to an input of logical AND circuit 69. The output of logical AND circuit 69 is connected to the set terminal of latch 70. The logical AND circuit 69 also has an input connected to the output of an inverter 68 which has its input connected to the output of logical AND circuit 66. Logical AND circuit 66 has inputs connected to the outputs of inverters 65 which have their inputs connected to the outputs of the stages forming counter 52. The output of logical AND circuit 66 is also connected to the reset terminal of latch 70.

Consequently, when counter 52 is other than zero, logical AND circuit 66 will not pass a signal to the reset terminal of latch 70 and inverter 68 will develop a positive going signal which is passed to logical AND circuit 69. Since logical AND circuit 69 is conditioned by latch 60 being off, it will pass a signal to the set terminal of latch 70. The set output of latch 70 is connected to beam control 40 so as to cause the same to move the beam horizontally to the right. As the beam moves horizontally to the right, grid 17 and photomultiplier 19 will cause pulses to be developed which are passed to amplifier 54. The output of amplifier 54 is connected to an input of logical AND circuit 72 which has its output connected to a terminal of counter 52 for subtracting from the value therein. Logical AND circuit 72 also has an input connected to the set output of latch 70. The pulses entered into counter 52 via logical AND circuit 72 subtract from the value therein and when counter 52 reaches zero, logical AND circuit 66 will be conditioned to pass a signal to the reset terminal of latch 70. Thus the beam is horizontally positioned to the right to the prescribed horizontal distance from the home position and latch 70 is reset.

The reset outputs of latches 60 and 70 are connected to inputs of logical AND circuit 75 which has its output connected to the character recognition circuit 25 for switching the same into a character recognition mode. The characters within the field to which the beam has been positioned are then scanned for information purposes. If, during the scanning operation, a reject character is encountered, then, after the characters in that line of the field have been scanned, the mode switches to the line finding mode. If a reject character is not encountered, then a new line in the field is scanned for information or if there are no other lines for that field, the mode switches to the format control mode and the beam is positioned to the next field to be scanned. The character recognition circuitry 25, when in the format control mode, furnishes a Field Advance signal via logical OR circuit 31 to format address storage 30. After the beam arrives at the next field, the operation switches to the character recognition mode as described above.

Assuming that a reject character is encountered, then at the end of the field, the character recognition circuit 25 develops a Reject signal and the mode switches to the line finding mode. The output of the character recognition circuit 25 on which the Reject signal appears is connected to an input of logical OR circuit 78. Logical OR circuit 78 has its output connected to the set terminal of latch 80. The set output of latch 80 is connected to an input of beam control 40 so as to operate the same in a manner where the beam is driven vertically upward. Hence, with latch 80 set as the Reject signal is passed via logical OR circuit 78, the beam will be caused to move vertically upward. The beam moves vertically upward until it reaches the upper edge of the document which, in this example, is equal to the vertical home position. The beam control 40 is capable of determining when the beam arrives at the vertical home position.

As the beam moves vertically upward, electrical pulses are developed by the combination of grid 16 and photomultiplier 18 and these pulses are entered into counter 51 via logical AND circuit 81 which has its output connected to an input of counter 51 for accumulating pulses in an additive manner. Logical AND circuit 81 has one input connected to the output of amplifier 53 and another input connected to the set output of latch 80. Hence, pulses will be entered into counter 51 until the beam reaches the vertical home position. The value then in counter 51 represents the line position containing the reject character.

The output line from beam control 40 for indicating that the beam has arrived in the vertical home position is connected to an input of logical AND circuit 82, to the reset terminal of latch 80, to an input of logical OR circuit 83 and to an input of logical AND circuit 90.

The output of logical AND circuit 82 is connected to an input of logical OR circuit 62, the output of logical OR circuit 83 is connected to the read, write and index controls 102, and the output of logical AND circuit 90 is connected to the set terminal of latch 91. The value in counter 51 will be transferred via logical AND circuits 84, which are conditioned at this time by character recognition circuit 25, to data storage 100. Logical AND circuits 84 have inputs connected to the outputs of the stages forming counter 51 and also have a conditioning input connected to the character recognition circuit 25. Although the character recognition circuit 25, when providing the Reject signal, conditions logical AND circuits 84 to pass the value from counter 51 to storage 100, nothing is entered into storage 100 until the read, write and index controls 102 are activated.

The read, write and index controls 102 are driven from clock 101 and are rendered operative when there is a signal passed via logical OR circuit 83. Logical OR circuit 83 passes a signal when the beam reaches the vertical home position. The sequence of operation of the read, write and index controls 102 is fixed. The outputs of the read, write and index controls 102 are connected to the word control ring 103 and to data storage 100. The arrangement of the read, write and index controls 102 and the word control ring 103 for controlling the read-in and read-out of data from data storage 100 are quite conventional. When the read, write and index controls 102 are activated, a read cycle first takes place and data, if any, is read-out from the word address designated by control ring 103 to sense amplifiers 104. The outputs of sense amplifiers 104 are connected to inputs of register 105. The next cycle within the read, write and index control cycle is a write cycle and the information passed by logical AND circuits 84 is written into data storage 100 in the same word addressed by the word control ring 103. The next cycle is an index cycle whereby word control ring 103 is advanced one position so as to address the next word in storage.

When the signal from beam control 40 resets latch 80, and since there is no Eject Document signal from character recognition circuitry 25, logical AND circuit 82 is conditioned to pass a signal via logical OR circuit 62 for setting latch 60. With latch 60 set, a signal will be passed to beam control 40 for driving the beam vertically downward. Further, logical AND circuit 55 will be conditioned for entering pulses into counter 51 in a subtractive manner. Thus the beam will be returned to the position it had just prior to switching into the line finding mode. When counter 51 reaches zero, latch 60 is reset and the inputs to logical AND circuit 75 will be satisfied. With logical AND circuit 75 satisfied, the character recognition circuitry 25 will be switched to the character recognition mode. Logical AND circuit 90 is not conditioned to pass a signal until the character recognition circuit 25 provides an Eject Document signal.

With the character recognition circuitry 25 in the character recognition mode, the logical AND circuits 84 will no longer be conditioned. The character recognition circuitry 25 will then develop a Field Advance signal which is passed via logical OR circuit 31 to format address storage 30. The beam will then be positioned to a new field of data in the manner previously indicated and the character recognition circuitry 25 will switch back to the character recognition mode and scan the characters in this new field of data. If another rejected character is encountered, the line containing that character will be found in the same manner as previously indicated and entered into data storage 100. Thus data storage 100 will contain values in sequential storage positions which identify the lines containing the rejected characters.

After the document has been completely read, the character recognition circuitry 25 generates an Eject Document signal which is passed to document drive 15, to inverter 63, to logical OR circuit 78, to logical OR circuit 83, to the reset terminal of word control ring 103 and to logical AND circuit 90. The beam of the cathode ray tube 11 will be sent to the home position upon the character recognition circuit 25 generating Eject Document signal. This signal when passed by logical OR circuit 78 sets latch 80 and the beam is sent upwards to the vertical home position. Beam control 40 develops a Home Y signal upon the beam arriving in the vertical home position which resets latch 80. With latch 80 reset, logical AND circuits 61 and 82 will not develop a signal to send the beam back down because the output of inverter 63 will be down. However, logical AND circuit 90 will pass a signal to set latch 91. The set output of latch 91 is connected to beam control 40 to activate the same whereby the beam is caused to move horizontally to the left. Beam control 40 has an output connected to the reset terminal of latch 91 and when the beam arrives in the horizontal home position, there is a Home X output signal from beam control 40 for resetting latch 91. The beam is now in the horizontal and vertical home position.

The document drive 15 is responsively operative to the Eject Document signal to move the document from the reading station and to drive the emitter grid disc 27 of pulse emitter 24. The emitter grid disc 27 is positioned between light source 28 and light sensitive device 29. The emitter grid disc 27 has alternate opaque and transparent areas which have the same widths as the alternate opaque and transparent areas of grids 16 and 17. The output of light sensitive element 29 is connected to an input of logical AND circuit 149 which has its output connected to the input of counter 150 and also has another input connected to the output of light sensitive element 162. Thus, the grid disc 27 as it is turned by document drive 15 will alternately intercept and let light pass from light source 28 to the light sensitive element 29. The pulses developed by light sensitive element 29 will represent a physical movement of the document equal to the distance between the grids or opaque areas of grid 16. These pulses are accumulated by counter 150 only upon detector 160 detecting the leading edge of the document to which all line positions have been referenced. Hence, a value can be developed which can be compared with the value of a line position stored in data storage 100.

The Eject Document signal from character recognition circuit 25 resets word control ring 103 to address the first word position in storage and passes via logical OR circuit 83 to activate the read, write and index controls 102. With the word control ring 103 reset to the first position, then the first value entered into storage 100 will be addressed as the read, write and index controls 102 are activated. On the read cycle, the value in the first word of data storage 100 is read-out through the sense amplifiers 104 to register 105. The read-out is destructive and therefore, the first word will be clear of any data. The next cycle is a write cycle, and since logical AND circuits 84 are not conditioned at this time, nothing will be written into data storage 100. The next cycle is an index cycle and the word control ring 103 is advanced to the second position to address the second word in storage.

When the leading edge of the document 10 is detected by detector 60, a pulse will pass from light sensitive element 162 to condition logical AND circuit 149. With logical AND circuit 149 conditioned, pulses developed by pulse emitter 24 will be passed to counter 150. The value in counter 150 is compared in parallel against the value in register 105 by compare unit 170 which is conditioned by an output from logical AND circuit 171. Compare unit 170 is of the type well known in the art, consisting of logical AND and OR circuits. The logical AND circuit 171 has an input connected to the output of light sensitive element 162 and an input connected to the output of an inverter 172. The inverter 172 has its input connected to the output of light sensitive element 22. Since the document has been detected by detector 160 and the document is no longer in the presence of light sensitive element 22, the conditions to logical AND circuit 171 will be met, and therefore, the compare unit 170 will be conditioned to compare the contents of register 105 with the contents of counter 150. When the contents of counter 150 equal that of the register 105, compare unit 170 develops an output signal which is transmitted to the printer 180. At this time, the document will have moved relative to the printer 180 whereby the first line containing the rejected character will be aligned in print position.

Upon the printer being actuated, a signal is developed for resetting register 105 and for activating the read, write and index controls 102 via logical OR circuit 83. Thus an identification mark will be printed adjacent to the left side of the first line of print on a document that contained a rejected character. Further, the register 105 is reset and the read, write and index controls 102 are activated to first effect a read cycle where a second value representing the second line containing a rejected character is transferred from data storage 100 to sense amplifiers 104 and from there to register 105. Secondly, the write cycle takes place and no data is entered into data storage 100 because the logical AND circuits 84 are not conditioned at this time. Thirdly, the word control ring 103 is advanced during the indexing cycle. During this time, counting continues and when the value in the counter 150 reaches the new value set into register 105, a second signal will be emitted from compare unit 170 for activating printer 180. Printer 180 will then print a mark alongside the left hand end of the second line of characters containing a rejected character. This second operation of the printer causes a second signal to be developed which resets register 105 and activates the read, write and index controls 102. Thus, the third position in storage will be addressed and the action continues in the manner previously described until all values in storage have been read therefrom and compared with the changing value in counter 150 and all lines on the document containing rejected characters have been properly marked. The trailing edge of the document 10 is sensed by detector 160 and the signal thus developed is passed from light sensitive element 162 to reset counter 150 via inverter 165. The system is now in its reset condition, the document has been read and the lines containing rejected characters have been marked and another document can be brought into reading position.

Although the spacing between the alternate opaque and transparent areas of the grid disc 27 is the same as that for grid 16, when the grid disc is turned by document drive 15, the resulting signals may not be in exact registration with the signals which had been developed by grid 16 and photomultiplier 18 and entered into counter 51. However, by making the spacings between the opaque areas quite small, relative to the spaces between lines on the document 10, this error will be negligible. For example, if line spacing is six lines to the inch, the opaque areas on the grid disc may be spaced thirty to the inch, or some other suitable number. Further, this error can be corrected for, if necessary, by introducing an analog time signal to compensate for the difference between the mis-registration of the signals developed by the grid 16 and the disc 27. This time signal can be developed by a timer which is started by a signal generated by detector 160 upon detecting the leading edge of the document.

It should also be realized that an analog system could be used for sensing the distance that the beam moves rather than using the grids 16 and 17. These analog signals would be converted to digital signals and the digital values would be entered into data storage during the line finding operation. For example, upon encountering a reject character during a character recognition operation, the beam would be sent upward to the vertical home position. The time that it takes for the beam to reach the home position can be expressed by analog voltage. This analog voltage can then be converted to a digital value and the digital value would be stored in data storage 100 in the same manner as the value from counter 51 is stored in data storage 100.

If the document drive 15 is of such a nature that the document 10 cannot be registered sufficiently accurately relative to the beam home position, it is possible to use the grid system to develop horizontal and vertical values indicative of registration error. These vertical and horizontal values then can be used as constants which are added into or subtracted from counters 51 and 52 prior to moving the beam to any new field position or for moving the beam to detect line position.

From the foregoing, it is seen that the invention provides apparatus for identifying line positions on a document and to operate a marking device when the identified line position becomes aligned therewith.

Further, it is seen that the line position to be marked is first identified by a random type sensor. Then the data identifying the line position is stored. Thereafter, when the document is moved from the reading position, each line position on the document is identified dynamically by a second line identifying device in terms of a value which is compared with the stored identifying data. When there is comparison between the stored identifying data and the newly developed identifying data, the line position to be marked is in print position relative to the marking device which is then operated.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a line marking system:
- means for identifying selected line positions on a document in terms of data;
- means for storing said line identifying data;
- marking means for marking line positions on said document;
- means for generating identifying data for every line position as the line positions on the document come into marking position;
- comparing means operably connected to compare said generated data for every line position with data in storage identifying selected line positions; and
- means connecting said marking means under control of said comparing means to render said marking means operable when there is a comparison between data identifying a line position of said every line position and data identifying a selected line position.

2. The line marking system of claim 1, wherein said comparing means sequentially compares data identifying selected line positions with generated data identifying every line position.

3. The line marking system of claim 1 further comprising means for connecting said storage means under control of said marking means whereby data identifying a selected line position is made available to said comparing means after every time said marking means is operated.

4. A line marking system comprising:
- first identifying means for identifying any line position on a document in terms of the number of digital increments the line position is away from a reference position;
- a data storage device;
- means connected to said first identifying means and said storage means for entering therein digital data identifying line positions;
- a marking device fixed at a predetermined position;
- second identifying means for identifying line positions in terms of digital data as the lines on the document come into marking position relative to said marking device; and
- comparing means having inputs connected to said data storage device and said second identifying means and an output connected to said marking device to operate the same upon the digital data of said second identifying means identifying a line position comparing with any digital data in storage identifying a line position.

5. In a document line marking system:
- first identifying means for selectively identifying line positions on a document while the same is at rest;
- data storage means for storing data representing selected identified lines by said first identifying means;
- a marking device for making line positions on said document;
- second identifying means for dynamically identifying each line position on said document;
- data receiving means connected to receive data from said second identifying means identifying a line position at the time each line position on a document comes into marking position relative to said marking device; and
- comparing means connected to said data storage means and said data receiving means to compare data entered into said data receiving means with data in said data storage means and operably connected to said marking device to operate the same when data in said receiving means compares with data in said storage means.

6. A document line marking system of claim 5 wherein said first identifying means comprises a cathode ray tube scanner positioned to have its beam scan said document;
- an optical grid;
- a photomultiplier positioned to sense the beam traversing said optical grid;
- a selectively operable counter connected to said photomultiplier for counting pulses therefrom; and
- control means connected to said scanner and to said counter for causing said beam to move in a vertical direction from any position on said document to a reference position and for rendering said counter operable during the time said beam is moving from said any position to said reference position.

7. The document line marking system of claim 6 wherein said data storage means stores data from said counter each time the beam arrives at said reference position.

8. The document line marking system of claim 7 wherein data from said counter is entered into sequential positions of said data storage.

9. The document line marking system of claim 8 wherein said second identifying means comprises:

means for identifying said reference position when the same is at a predetermined position relative to said marking device;

pulse generating means for generating the same number of pulses between line positions as generated by said optical grid and rendered operative in synchronism with movement of said document; and logical gating means operably connected to said means for identifying said reference position and connected to said pulse generating means to receive pulses therefrom and provide pulses to said data receiving means when rendered operable by said means for identifying said reference position.

10. The document line marking system of claim 9 wherein said means for identifying said reference position comprises a light source and a light sensitive element.

11. The document line marking system of claim 10 wherein said pulse generating means comprises:

a light source;

a light sensitive device; and an emitter disc having alternate opaque and transparent sections interposed between said light source and said light sensitive device.

12. The document line marking system of claim 11 wherein said data receiving means comprises a counter connected to the output of said logical gating means.

13. The document line marking system of claim 12 further comprising means connecting said data storage means under control of said marking device whereby every time said marking device operates a new set of line identifying data in storage is made available to said comparing means.

14. In a document line marking system:

a cathode ray tube scanner positioned to have its beam scan lines on a document;

control means for moving said beam in a vertical direction from any position on the document to a reference position;

means for expressing the distance that said beam moves from any position to said reference position in a digital value;

means for storing said digital values;

a marking device;

means for identifying each line position in terms of a digital value relative to the distance each line position is from said reference position as each line position comes into marking position; and comparing means connected to said data storage and said means for identifying each line position and connected to said marking device to render the same operable when a digital value in said data storage compares with a digital value from said means for identifying each line position.

15. The document line marking system of claim 14 further comprising:

means connecting said data storage under control of said marking device whereby a digital value in data storage is made available to said comparing means after every time said marking means is operated.

16. In a line marking system:

first means for identifying line positions on documents in terms of digital values;

storage means for storing digital values of said first means identifying line positions;

marking means for marking lines on said documents;

means for bringing successive lines on said documents into marking position relative to said marking means;

second means for identifying each line on said documents in terms of digital values as each line comes into marking position; and comparing means connected to compare digital values in said storage means with digital values developed by said second means and connected to operate said marking means whenever there is a comparison between said compared digital values.

References Cited

UNITED STATES PATENTS

| | | | |
|---|---|---|---|
| 2,059,805 | 11/1936 | Page | 101—93 |
| 3,221,302 | 11/1965 | Silverberg | 340—146.3 |

THOMAS A. ROBINSON, *Primary Examiner.*